United States Patent [19]

Minovitch

[11] 4,078,747

[45] Mar. 14, 1978

[54] ORBITING SOLAR POWER STATION

[75] Inventor: Michael A. Minovitch, Los Angeles, Calif.

[73] Assignee: Phaser Telepropulsion, Inc., Los Angeles, Calif.

[21] Appl. No.: 582,699

[22] Filed: Jun. 2, 1975

Related U.S. Application Data

[63] Continuation-in-part of Ser. No. 490,355, Aug. 13, 1974, abandoned.

[51] Int. Cl.² ............................................. B64G 1/30
[52] U.S. Cl. .............................. 244/159; 174/128 S; 322/2 R; 335/216
[58] Field of Search ............... 244/159, 158, 173, 168; 310/4 R; 322/2 R, 4; 321/8 R; 325/115; 335/216; 174/128 S

[56] References Cited

U.S. PATENT DOCUMENTS

| | | | |
|---|---|---|---|
| 3,304,028 | 2/1967 | Dryden | 244/168 |
| 3,549,952 | 12/1970 | Sole | 335/216 X |
| 3,686,458 | 8/1972 | Denel et al. | 335/216 X |
| 3,740,636 | 6/1973 | Hogrefe et al. | 244/173 X |
| 3,758,051 | 9/1973 | Williams | 244/173 X |
| 3,781,647 | 12/1973 | Glaser | 310/4 X |

OTHER PUBLICATIONS

"Power from the Sun: Its Future," *Science*, Peter Glaser, vol. 162, No. 3856, 11/22/68, pp. 857–861.

*Primary Examiner*—Trygve M. Blix
*Assistant Examiner*—Barry L. Kelmachter
*Attorney, Agent, or Firm*—Christie, Parker & Hale

[57] ABSTRACT

The invention described herein is an orbiting solar powered, energy collecting, storage and transmitting station. Initially, a large array of solar cells collects and transforms radiant solar energy into moderate amounts of electrical current. This electrical current is fed into a large superconducting coil where it is gradually built up to very high values. The electrical energy is thereby converted and stored in the resulting magnetic field. This magnetic energy is extracted by drawing off the current at very high rates and used to energize a laser or microwave generator for wireless power transmission. Since the discharge of the superconducting coil can proceed at rates many times greater than the charging rate, the resulting beamed power can, over short time intervals, be many times greater than the rate of solar radiation falling on the solar array. Alternatively, the energy can be stored gradually in rotating flywheels for fast rate beaming.

14 Claims, 6 Drawing Figures

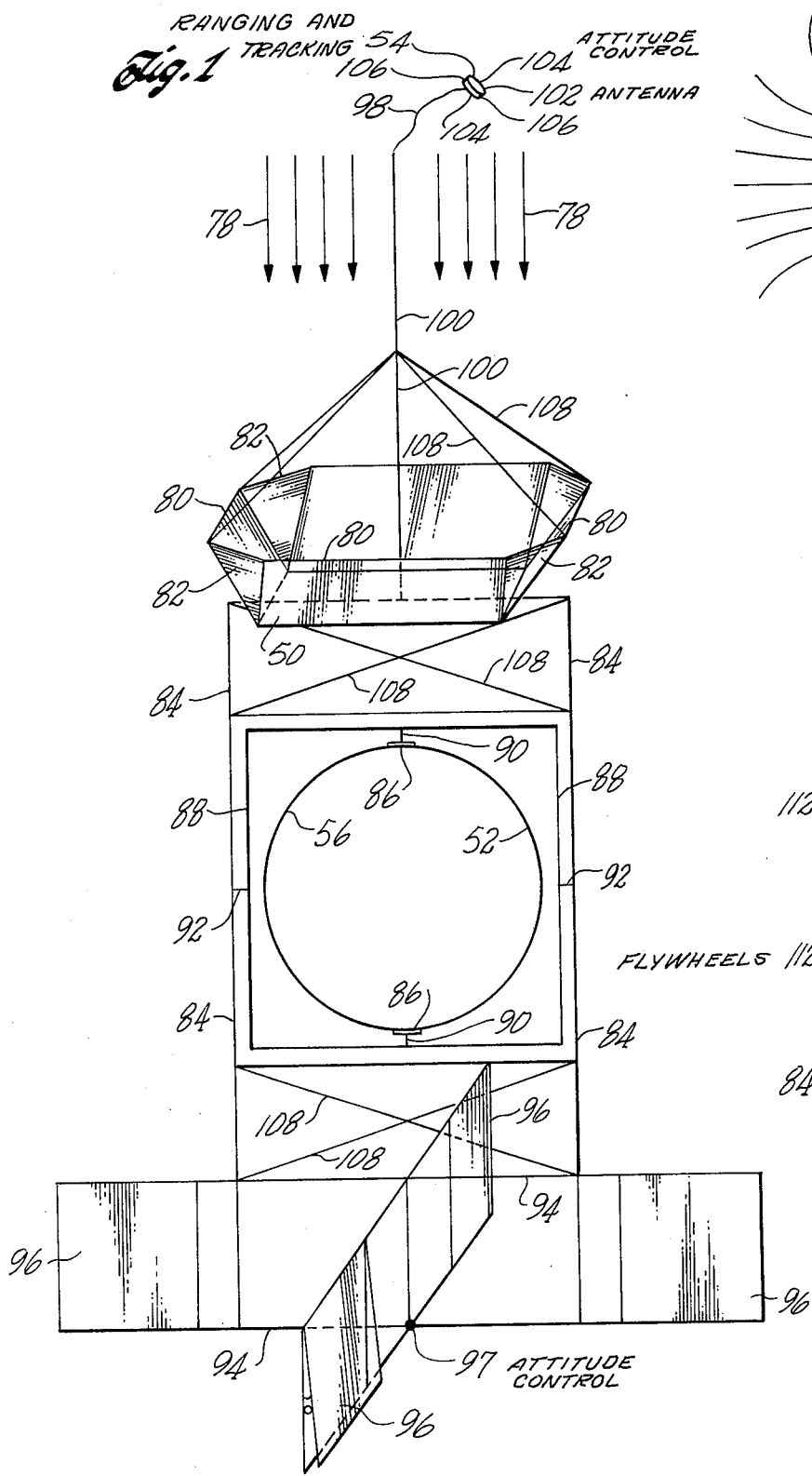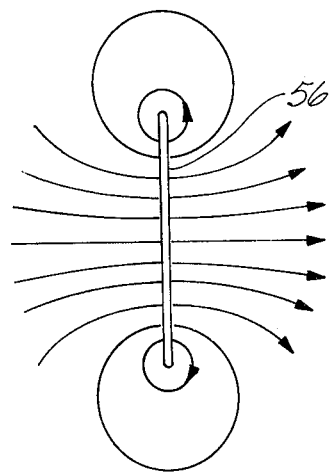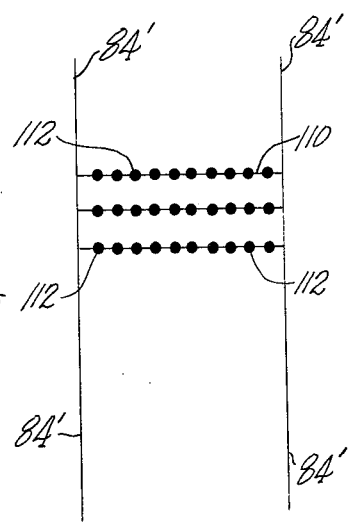

ORBITING SOLAR POWER STATION

BACKGROUND

This is a continuation in part of my copending patent application Ser. No. 490,355 filed Aug. 13, 1974, now abandoned.

In 1968 Peter Glaser introduced his concept for an orbiting solar power station which converts solar radiation into microwave radiation which is beamed continuously to earth where it is reconverted into electric power for distribution. (See, "Power from the Sun: Its Future", *Science,* Vol. 162, pp. 857–861, 1968.) Unfortunately, since the solar constant (the amount of solar radiation falling on 1 square meter of area perpendicular to the radiation and at a distance of one astronomical unit) is only 1.34 KW/$m^2$ and since the best solar cells convert solar radiation into electric power with an efficiency of only about 12%, it requires an enormous array of solar cells to produce high electric power levels on the order of several GW (1 GW = $10^9$ watts). In order to generate 1 GW of electric power the solar array must be 6.2 × $10^6 m^2$ which is equivalent to a square array 2.5 kilometers on end. But an array this large is unavoidable if the electric power is to be used to generate continuous electromagnetic radiation for continuous wireless power transmission.

There are other important uses for beamed electromagnetic radiation which does not require continuous power transmission. In my U.S. Pat. No. 3,825,211 entitled LASER ROCKET, filed June 19, 1972, I show how a rocket vehicle can be propelled by converting the radiant power in a laser beam, that is intercepted by the vehicle, into propulsive thrust. This allows the relatively massive energy generating mechanism to be separated from the vehicle which results in increased vehicle performance. Since the thrusting maneuvers last only a few minutes and are separated by relatively long periods of time (usually 24 hours) the laser generator need not remain in continuous operation. A similar rocket propulsion system is described in my copending U.S. patent application Ser. No. 343,197 entitled MICROWAVE POWERED REUSABLE ORBITING SPACE TUG, filed Mar. 21, 1973, now U.S. Pat. No. 3,891,160. Therefore, the relatively long time intervals between successive power transmissions can be utilized for accumulating energy in an energy storage system by relatively low input power and extracting it at a much higher rate over a much shorter time period during power transmission.

The fundamental differences between prior art orbiting solar power stations and this solar power station is the addition of a high capacity, rechargeable, energy storage system for accumulating solar energy over relatively long time intervals and retransmitting it later over short time intervals at higher powers. Thus, the design of a light weight, high flux, high capacity, rechargeable energy storage system will be an important part of this patent.

The most important characteristics of large energy storage systems are: high energy storage capacity, high efficiency, high energy density and high power density. Energy density is defined as the total energy storage capacity of the system divided by its total mass E/M and power density is defined as the highest power P that the system can generate during a discharge divided by its total mass P/M. Due to the extremely high transportation cost of launching payloads into orbit, a space based energy storage system should have the highest possible energy density. In a recent patent entitled "Inertial Energy Storage Apparatus and System for Utilizing the Same," U.S. Pat. No. 3,683,216 by Richard Post, there is described a flywheel energy storage system that is designed to operate close to the maximum possible energy density limit. This limit (which is the same for all kinetic energy containment systems such as flywheels or the containment of hot gases) can be derived from the virial theorem (see Elementary Plasma Physics, *Interscience Publishers,* 1963 by Longmire). In particular, if M denotes the structural mass with density $\pi$ that is used to contain an amount of kinetic energy E with a uniaxial stress $\sigma$, then $$M \geq \frac{2\rho E}{\sigma}$$

(MKS units are employed throughout this paper). In the case of a spinning flywheel, M refers to the mass of the flywheel and E denotes its kinetic energy. This energy is given by the equation $E = \frac{1}{2} I\omega^2$ where I denotes the flywheel's moment of inertia about its spin axis and $\omega$ is its angular velocity. An optimally designed flywheel energy storage system, therefore, has a maximum possible energy density given by $$\frac{E}{M} = \frac{\sigma}{2\rho} \quad (1)$$

where $\pi$ and $\sigma$ denote the flywheel's density and tensile strength respectively. When compared to other rechargeable energy storage systems, such as batteries, fuel cells, compression of gases, pumped-hydro, elastic deformation (steel springs) etc. the Post flywheel system has energy densities and charge and discharge rates many times greater.

Recent advances in the field of superconductivity have now opened the way to a totally new concept of energy storage that does not involve kinetic energy. This concept utilizes the inductive energy stored in a magnetic field. Until relatively recently, high magnetic fields could only be obtained by passing large currents through the coils of electromagnets. These coils, being normal conductors, such as copper or aluminium, had inherent resistance. The power P (expended in the form of heat) that is required to maintain the magnetic field is given by the equation P = $i^2$R where $i$ and R denote the current and resistance of the coil. Since high field electromagnets require very high currents, the power consumed by electrical resistance in high field electromagnets is enormous.

The development of superconducting materials (namely Type II superconductors) however, now makes possible superconducting magnets having coils of zero resistance. A current passing through the coil of a superconducting magnet has no resistance and will remain constant without loss of power. (See "Large-Scale Applications of Superconducting Coils", *Proceedings of the IEEE,* Vol. 61, No. 1, January, 1973, by Z. Stickle and R. Thome.) The applications of superconducting magnets as depositories of electrical energy is possible by utilizing the coil's self inductance. If a superconducting coil has a self-induction L, the magnetic field has an inductive energy given by the equation $$E = \frac{1}{2} L i^2 \quad (2)$$

Consequently, superconducting magnets can be used for storing electrical energy without loss. Devices known as flux pumps and homopolar generators are used to transfer current in and out of a superconducting coil which becomes the means by which energy is fed into and out of the magnet. (See *McGraw-Hill Encyclopedia of Science and Technology*, Vol. 13, 1971, p. 306, and "Superconductive Energy Storage for Power Systems", *IEEE Transactions on Magnetics*, Vol. MAG-8, No. 3, p. 701, September 1972 by R. Boom and H. Peterson.) The result is a magnetic energy storage system with no moving parts that can go through an unlimited number of charge and discharge cycles without ever wearing out and that has an overall in-out operating efficiency very close to 100%. It should be pointed out, however, that since the superconducting coil has to be kept at very low cryogenic temperatures, a refrigeration system will be necessary and this system will require the expenditure of some power. But this energy loss will be very small compared to the energy storage capacity. Moreover, if the storage system is operated in an environment that is very cold to begin with, such as in outer space and shielded from the sun's rays, the refrigeration system will require very little power.

For inductive energy storage systems, the virial theorem requires only half of the restraining structural mass needed for mechanical systems based on kinetic energy confinement. For inductive systems $$M \geq \frac{\rho E}{\sigma}$$

In this inequality, the mass M refers to the conductor's mass (i.e., coil mass) which generates the magnetic field. Consequently, for magnetic energy storage systems, the maximum energy density is given by the equation $$E/M = \sigma/\pi \tag{3}$$

where E refers to the magnetic inductive energy given by equation (2). Thus, in theory, a superconducting magnetic energy storage system offers the possibility of obtaining energy densities twice those that are possible with flywheel systems.

As in the case of flywheel systems, the geometrical shape of the coil is an important consideration and can greatly affect the value of E/M given in the above equation for magnetic energy storage systems. It will be shown that coils in the form of thin donuts will give E/M values fairly close to the virial limit given above.

Donut-shaped coils are called dipoles. They are among the few coil shapes that are entirely self-supporting when energized with a current. Thus, the dipole coil also supplies the required structural material that is required to restrain the very large magnetic forces that tend to break apart the coil. These $\bar{J} \times \bar{B}$ Lorentz forces arise when current elements in the coil, with current density $\bar{J}$, interact with the resulting magnetic field $\bar{B}$. They tend to expand the dipole radially outward from its center (which results in a large tension force) and secondary forces tending to compress the ring of the dipole inward toward its minor axis.

Since thick dipole magnets are difficult to cool and thin dipole magnets require large areas for their installation, most prior art superconducting magentic energy storage systems use solonodial or toriodial coil shapes. But these shapes are not self-supporting and require a great amount of structural material (usually steel) to prevent their collapse. This added material, however greatly increases the system's mass which results in a decrease in energy density E/M. However, for large stationary, earth based systems, energy density is not considered important. But for orbiting systems the energy density will be very important. Thus, one of the major goals of this patent is to present a light weight, high energy density, superconducting magnetic energy storage system that is entirely self-supporting. Hence, in order to take advantage of the self-supporting characteristics of dipole coils the magnetic energy storage system presented here will be based on a dipole coil configuration.

A dipole superconducting self-supporting magnetic energy storage system offers the possibility of obtaining a rechargeable energy storage system with an in-out efficiency of nearly 100%. Moreover, it will be shown that the system also offers the theoretical possibility of doubling the energy density of the most efficient flywheel systems. Consequently, for equal amounts of stored energy, a dipole, self-supporting magnetic energy storage system offers the possibility of reducing the required structural mass to almost one-half that required for the most efficient flywheel systems. Since the system will have to be transported to an orbit high above the earth, which will be a very costly process, this possibility for significantly reducing structural mass without reducing the amount of stored energy capability is an important consideration. It should also be pointed out that the vacuum of space is an ideal environment for a superconducting magnetic energy storage system. The system could be easily shielded from the sun's rays so that it will be relatively easy to maintain the required cryogenic temperatures. Furthermore, the resulting magnetic field does not have to be shielded as they are for earth bound systems and the over all dimensions of the system could be very large. Indeed, space may well be the optimum environment for large superconducting magnetic energy storage systems. Furthermore, since the power density capability of magnetic energy storage systems are tremendous-where even relatively small systems have the ability of discharging at several GW (1GW = $10^9$watts) - the power released from a magnetic energy storage system will be more than enough to power any laser or microwave generator for wireless power transmission.

Thus, according to principles of this invention, a relatively small array of solar cells is maintained in an orientation perpendicular to the sun's rays. The resulting current is fed into the coil of a superconducting magnet which increases its magnetic field. The input energy is thereby accumulated and stored inductively in the coil's magnetic field. When this energy is released, it will reappear as electric current, only at power levels many times higher than that generated by the solar array. This power is then used to energize a high power laser or microwave transmitter for intermittent wireless power transmission.

It is estimated that 72% of the total installation cost of Glaser's orbiting solar power station (that transmits continuous power) will be expended just in transporting the enormous solar array from the earth's surface to orbit. (See, "Solar Power Via Satellite", *Astronautics and Aeronautics*, Vol. 11, No. 8, August 1973, pp. 60–68, by Peter Glaser.) The system presented in this patent will allow wireless power transmission at the same levels as Glaser's station but with a much smaller solar array. This will result in a significant reduction in cost.

The only penalty will be in the total amount of energy transmitted over long time periods. The flux, however, can remain unchanged and could even be greater than that contemplated by Glaser. For the applications envisioned in this patent, continuous power transmission is not needed.

BRIEF SUMMARY OF THE INVENTION

Thus, in the practice of this invention according to a presently preferred embodiment, there is provided an orbiting solar power station having an array of solar cells for converting incident solar radiation into electricity and a superconducting dipole, self-supporting magnetic energy storage system that is charged over relatively long time intervals by current from the solar cells. The energy accumulated in the magnetic field is extracted over a relatively short time interval at power levels many times greater than that generated by the solar cells. This power is then used to energize a high power laser or microwave generator for wireless power transmission during a relatively short time interval. The transmitter is provided with an accurate tracking system in order to point the beam accurately.

The beamed power could be used to provide propulsive power to space vehicles as described in my aforementioned U.S. Pat. No. 3,825,211 and U.S. patent application Ser. No. 343,197. The power could also be beamed to other orbiting satellites or to specific targets on or above the earth's surface.

DRAWINGS

These and other features and advantages of the present invention will be appreciated as the same becomes understood by reference to the following detailed description of a presently preferred embodiment when considered in connection with the accompanying drawings wherein:

FIG. 1 is a schematic perspective view of the orbiting solar power station;

FIG. 3 is a cross section of a thin ring dipole magnet along its major axis illustrating its magnetic field;

FIG. 6 describes an alternative energy storage system using flywheels.

DESCRIPTION OF THE PREFERRED EMBODIMENT

FIG. 1 is an over-all schematic perspective view of a presently preferred embodiment of an orbiting solar power station constructed according to principles of this invention. It is composed of three basic parts; a solar array 50, a superconducting magnetic energy storage system 52, and an electromagnetic radiation transmitter 54.

One of the most important parts of the orbiting solar power station described in this patent is the magnetic energy storage system which accumulates energy received from the solar array 50 over a relatively long time interval and releases it over a relatively short time interval to the transmitter 54. Since a dipole magnet is self-supporting this coil geometry is adopted as a basic ingredient of the system. But there are many important technical details concerning the design of the magnet which must be considered. These details concern size, energy storage, energy density, magnetic fields, magnetic forces and how they relate to the conductor's tensile stress $\sigma$, density $\pi$, and current density J. These design parameters and their relationships are presented here in order to teach how all of these parameters can be put together so as to obtain an optimally designed superconducting dipole magnet for large orbiting solar power stations; their limitations, and where new research developments in superconducting materials will lead to the most dramatic performance increases.

Figure 2:
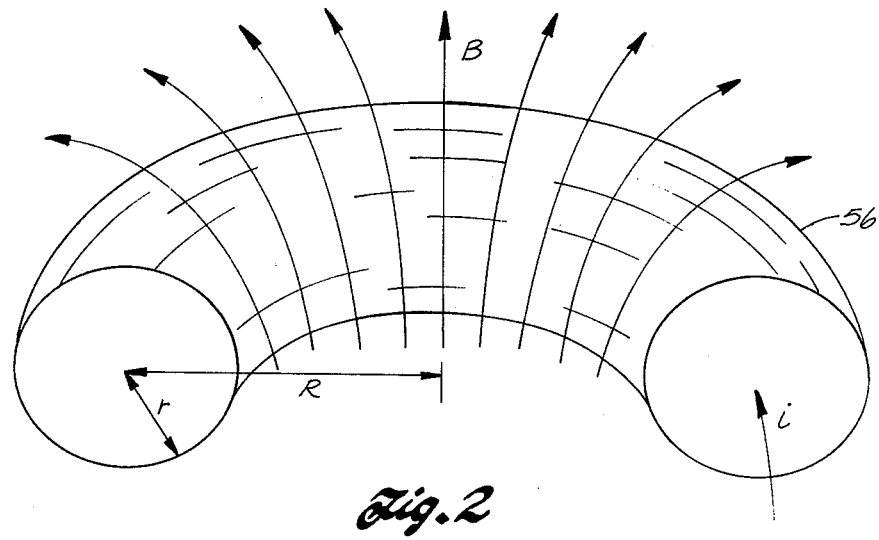
FIG. 2 is a perspective view of half of a dipole magnet showing relative geometrical relationships.

According to Smythe, *Static and Dynamic Electricity*, McGraw-Hill, 1950, the self inductance L of a dipole coil with major axis R and minor axis r (see FIG. 2) is given by $$L = \mu_0 R[\log(8R/r) - 1.75] \quad (4)$$

where $\mu_0$ denotes the magnetic permeability of free space. (In MKS units, $\mu_0 = 4\pi \times 10^{-7}$ henry/meter.) Therefore, with the aid of this equation and equation (2), the total radial outward force F acting on the dipole is $$F = \frac{\delta E}{\delta R} = \frac{1}{2} i^2 \frac{\delta L}{\delta R}$$

$$= \frac{1}{2} i^2 \mu_0 [\log\left(\frac{8R}{r}\right) - .75]$$

where $i$ denotes the total current flowing through the loop's total cross-sectional area A. If $F_t$ denotes the total tension in the loop, its stress $\sigma = F_t/A = F_t/\pi r^2$. Hence, since $F_t = F/2\pi$, we obtain $$F_t = \frac{F}{2\pi} = \frac{i^2}{4\pi} \mu_0[\log\frac{8R}{r} - .75] = \pi r^2 \sigma \quad (5)$$

The total mass M of the conductor with volume V and density $\rho$ is given by $M = V\rho = 2\pi^2 r^2 R\rho$. Consequently, in view of equations (2), (4) and (5) the energy density E/M of the dipole is $$\frac{E}{M} = \left[\frac{\log\left(\frac{8R}{r}\right) - 1.75}{\log\left(\frac{8R}{r}\right) - .75}\right]\left(\frac{\sigma}{\rho}\right)$$

By defining the aspect ratio $\gamma = R/r$, this equation can be expressed as $$\frac{E}{M} = \frac{\log(1.3902\gamma)}{\log(3.7789\gamma)}\left(\frac{\sigma}{\rho}\right) \quad (6)$$

Table 1 describes the numerical value of the shape factor $f(\gamma) = \log(1.3902\gamma)/\log(3.7789\gamma)$ as a function of the aspect ratio $\gamma$.

TABLE 1

| $\gamma$ | $f(\gamma)$ |
|---|---|
| 2 | .5056 |
| 4 | .6318 |
| 6 | .6796 |
| 8 | .7066 |

TABLE 1-continued

| $\gamma$ | $f(\gamma)$ |
|---|---|
| 10 | .7247 |
| 50 | .8092 |
| 100 | .8315 |
| 500 | .8674 |
| 1,000 | .8786 |
| 5,000 | .8984 |
| 10,000 | .9051 |

From this table we observe that as $\gamma$ becomes large, the dipole's magnetic energy density approaches the virial limit given in equation (3). Consequently, since $\sigma$ and $\rho$ are independent of $\gamma$, the most efficient shape of the dipole (which produces highest energy densities) is a very thin hoop $r << R$. However, there is a practical limit on $\gamma$ which should not be exceeded. If $\gamma$ becomes too large, the required current densitites become large also which will exceed the limitations imposed by the magnetic field. A longitudinal cross section of the magnetic field generated by a thin dipole magnet 56 is shown in FIG. 3.

From equation (6) it is clear that (as in the construction of efficient flywheels) a superconducting dipole magnetic energy storage system should be constructed with materials such that the ratio $\sigma/\rho$ is a maximum. Unfortunately, almost all of the best Type II superconductors such as $Nb_3S_n$, $V_3Ga$, $Nb_3Al$ and $Nb_3(Al_{0.8}Ge_{0.2})$ are very brittle, break easily and have very high densities. The ratios $\sigma/\rho$ have striking low values. This is a problem that does not arise in the design of efficient flywheels because flywheel material need not have any other special properties, such as superconductivity. Thus, at first glance, it might appear that a dipole, self-supporting magnetic energy storage system will have inherently poor energy density characteristics.

There is a way to circumvent this problem of low $\sigma/\rho$. The solution described in this patent involves the actual fabrication of high strength, low density, superconducting filaments by vapor depositiong a thin coat of superconductor onto a fiber substrate having high $\sigma$ and low $\rho$. The resulting filaments are then combined to form a superconducting cable with extremely high $\sigma/\rho$ ratios. The cable is then wound in the form of a dipole superconducting magnet which is self-supporting. Since the vapor coating is extremely thin, the resulting cable has $\sigma$ and $\rho$ values essentially equal to those of the original fiber substrate material.

The fact that a superconductor can be vapor deposited on a high strength, low density, carbon fiber has been demonstrated in a paper entitled "Superconducting Properties of Thin Film Niobium Carbonitrides on Carbon Fibers", *IEEE Transactions on Magnetics*, Vol. Mag- 11, No. 2, March 1975, pp. 185-188 by G. E. Pilce, et al. For definiteness, I shall quantify the discussion by a numerical example based on actual experimental data. In one case examined in the above-mentioned paper, a coat of niobium carbonitride superconductor with thickness 940 Angstrom units (9.4 × $10^{-6}$cm) was vapor deposited onto a carbon fiber having a diameter of 7 $\mu$ (7 × $10^{-4}$cm). The resulting filament had a critical current density $J = 1.5 \times 10^6$ amp/ $cm^2$ in a magnetic field of 3T (1T = 1 Tesla = 10,000 Gauss) at a temperature of 4° K. Moreover, the experiments also showed that the superconductor was probably intrinsically stable which would eliminate the need for any stabilizer material such as copper or aluminum. Since these experiments were conducted at 4° K we shall assume that intrinsic stability will occur at the superfluid helium temperature of 1.0° K to 1.6° K used in this invention.

In his study of optimum flywheel designs having maximum energy storage densities equal to the theoretical virial limit $\sigma/2\rho$, Post gives this limit for carbon fibers at 9.21 × $10^5$ Joules /Kg (See "Flywheels," *Scientific American*, Vol. 229, No. 6, December, 1973, pp. 17-23, by Richard Post and Stephen Post.) Consequently, according to this data a multi-filament superconducting cable of carbon fibers coated with niobium carbonitride will have $\sigma/\rho = 1.842 \times 10^6$ Joules/Kg. Therefore, if the aspect ratio $\delta$ for a dipole, self-supporting, superconducting magnetic energy storage system is 1000, the resulting energy density will be E/M = 1.62 × $10^6$ Joules/Kg. However, this density is still considerably less than the best possible flywheel energy storage system using a flywheel constructed of fused silica fibers. In this case E/M (flywheel) $= \sigma/2\rho = 3.42 \times 10^6$ Joules/Kg. However, if the niobium carbonitride superconductor could be deposited on fibers of fused silica substrate, the resulting energy density of a dipole with $\delta = 1000$ would be 5.694 × $10^6$ Joules/Kg. It should also be noted that the values of E/M given here for flywheel systems do not take into consideration the extra structural mass that supports the flywheel and insures its smooth running. Nor does it take into account the motor-generator used to transfer energy into and out of the flywheel. Thus, the actual energy densities of flywheel storage systems will be much lower than the numbers given here. On the other hand, a magnetic energy storage system has no moving parts and the supporting systems, such as flux pumps and refrigeration systems should represent a much lower proportion of the total mass than the supporting structures and systems associated with flywheel systems.

It may be impossible to deposit a thin coat of superconductor onto fused silica fibers. However, it will be possible to construct a cable of coated carbon fibers, strengthened by multiple filaments of fused silica fibers. We shall show how this can be done and describe quantitatively, the required proportions of fused silica that must be added to obtain a cable that will give the desired dipole performance.

In the above case where a 7$\mu$ diameter carbon fiber is coated with a thin layer of niobium carbonitride 940A thick, the critical current density for the conductor was measured at 1.5 × $10^6$ amps/$cm^2$ in a magnetic field of 3 T at 4° K. The average critical current density for the coated filament can be easily calculated. The result, which will be denoted by $J_o$, is 77,437 amp/$cm^2$. (The superconductor itself, however, would still have a critical current density of 1.5 × $10^6$ amp/$cm^2$. The conducting cable for the dipole magnet presented in this patent is fabricated by constructing an inner core of coated carbon fiber filaments, reinforced by a layer of fused silica (or fused quartz) filaments that surrounds the superconducting core. This outer layer will also serve as insulation for the superconducting core.

Another unique feature of the proposed carbon fiber-fused silica cable is its exterior shape. This is because the dipole will generate very high magnetic fields - much higher than those of ordinary superconducting magnetis. Consequently, the compressive forces will be much larger. If the dipole were wound with cables of circular cross section, space would be left between adjacent cables. Under very high compression forces the cables would collapse inward and fill these spaces. The cables would be deformed and this deformation could fracture the superconducting filaments. Therefore, the cable presented in this patent will have an equilateral triangular cross section configuration. After the dipole is completely wound it will have a hexagonal cross section.

Figure 4:
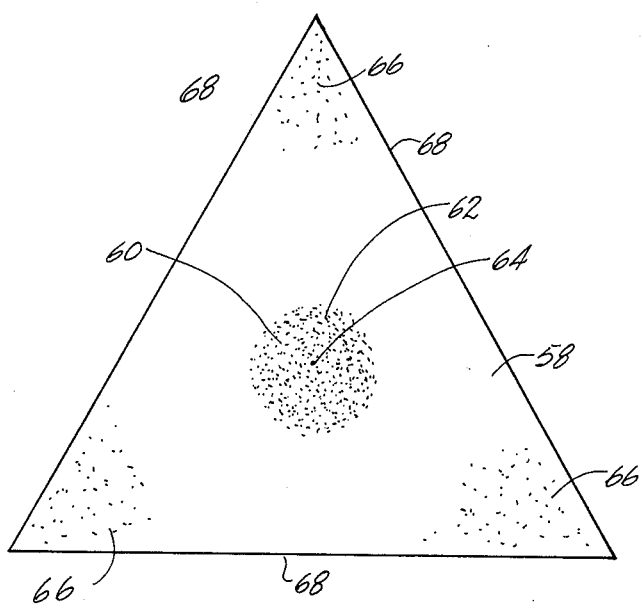
FIG. 4 is a schematic transverse cross section of a greatly enlarged multi-filament reinforced superconducting cable illustrating its internal design and external shape.

FIG. 4 is an enlarged cross section of a segment of the cable 58 with an appropriate superconductor 62 such as niobium carbonitride located in the region of the center 64 of the cable (defined as the intersection of the perpendicular bisectors). These filaments become the cable's superconducting core. The remaining area of the triangular cross section is occupied by the fused-silica fibers 66. The fibers are bonded with a resin and the entire cable is enclosed by a thin jacket of stainless steel 68. The cable is 1.0 cm on the end giving a total cross-sectional area of 0.433 cm².

Figure 5:
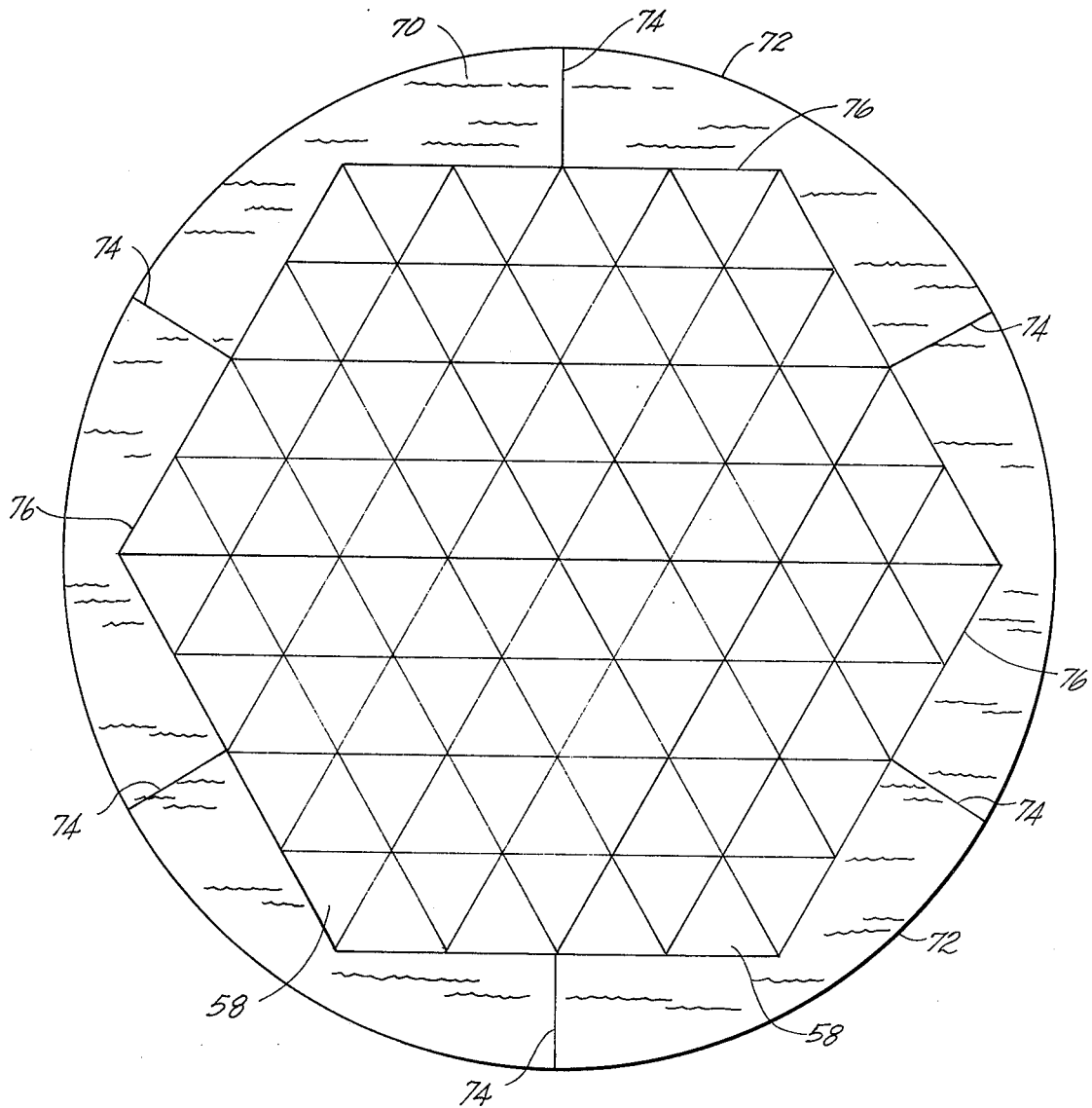
FIG. 5 is a transverse cross section of the dipole coil and cryostat.

FIG. 5 is a semi-schematic cross section of the completely would dipole magnet showing the individual triangular superconducting cables 58. FIG. 5 illustrates the core as having about 100 cables; the structure actually has about 1000 such cables but is not specifically illustrated for clarity. Thus, in this design, the packing-fraction is 1.0 and there is no space left between adjacent cables. This design will, therefore, be able to sustain extremely high compression forces with no movement of the conductor.

Since the above analysis concerning energy density E/M shows that efficient dipoles have large aspect ratios $\delta$, the minor axis $r$ will only be a few centimeters in diameter. Hence, the dipole will be cooled to cryogenic temperatures by immersing its entire exterior surface in a bath of superfluid helium 70 at temperatures of 1.0° K to 1.6° K. Thus, the cryostat containing circulating superfluid helium 70 has a toroidal shape which completely envelops the entire dipole coil. Its outer wall 72 is a thin layer of stainless steel, painted with a coat of special Illinois Institute of Technology's "Z-93" white paint. This paint has a low coefficient of absorption $\alpha$ for solar radiation and high coefficient of emissivity $\epsilon$ so that the ratio $\alpha/\epsilon = 0.18$. Consequently, this coating will offer very good protection from temperature rises due to incident solar radiation. In fact, it will tend to keep heat flowing outward away from its interior and hence will become a natural "passive" refrigerator that requires no power to keep it operating. The toroidal cryostat is supported by stand-off rods 74 located at intervals along the circumference of the dipole. These rods 74 are connected to the dipole by a thin jacket of stainless steel 76 which surrounds the coil windings. There will be no heat transfer by convection because of the vacuum environment. The heat transfer by conduction from structural connections to the solar array 50 will be exceedingly small because they will be constructed from materials, such as fiberglass, with low thermal conduction. In addition, this structure will also be painted with "Z-93" white paint.

If $B_m$ denotes the maximum magnetic field intensity of the dipole (which will occur on its surface closest to its major axis) then if $\delta >> i$ it is given by the equation $$B_m = \frac{\mu_o i}{2\pi r} \tag{7}$$

where $r$ and $i$ denote the radius of the dipole's minor axis (FIG. 2) and total current respectively. Although this equation and others used in this paper are based on dipoles having circular cross section we shall assume that they also hold, with sufficient accuracy, for a dipole with hexagonal cross section. The magnetic pressure P tending to compress the sides of the dipole inward on all sides toward its minor axis is given by $$P = \frac{B_m^2}{2\mu_o} \tag{8}$$

For example, if $B_m = 40T$, $P = 6.37 \times 10^8 N/m^2$ (92,330 lbs/in²). The compressive force along the minor axis will be 2P which is $7.16 \times 10^8 N/m^2$ (185,000 lbs/in²). However, because of the unique cable and dipole cross section designs described in this patent, these forces will be within the capabilities of the materials. The cables' bulk modulus of elasticity that resists compression deformation will have a minimum value of $8 \times 10^{10} N/m^2$ (11,000,000 lbs/in²). Thus, in principle the dipole could withstand magnetic fields as high as 300T before volume compression begins.

Let $A_c$ and $A_s$ denote the cross-sectional areas of the dipole occupied by the carbon fibers coated with the superconductor and that occupied by the uncoated fused silica filaments where $A = A_c + A_s$ = total cross-sectional area. Let the variable $\eta$ ($0 \leq \eta \leq 1$) be defined by $\eta = A_c/A$. Then, it follows that the dipole's current density $J = i/A = \eta J_0$ where $J_0$ denotes the current density of the superconducting filaments. We can also express the tensile strength $\sigma$ and density $\rho$ of the cable by the equations $$\sigma = \sigma_1 \eta + \sigma_2 (1-n), \rho = \rho_1 \eta + \rho_2 (1-\eta) \tag{9}$$

where $\sigma_1$, $\rho_1$, $\sigma_2$ and $\rho_2$ refers to the tensile strength and density of the carbon fiber filaments and fused silica filaments respectively. In MKS units $\sigma_1 = 0.28 \times 10^{10} N/m^2$, $\rho_1 = 1520$ Kg/m³, $\sigma_2 = 1.4 \times 10^{10} N/m^2$ and $\rho_2 = 2160$ Kg/m³. Omitting the analysis it follows from these equations, together with equations (5) and (7) that $$\eta = \frac{\sigma_2 - \left[\frac{B_m^2}{\mu_0}\right][\log(8\gamma) - .75]}{\sigma_2 - \sigma_1} \tag{10}$$

This equation was derived on the assumption that the cable is at the limit of its tensile strength precisely when the maximum tolerable magnetic field $B_m$ is reached. This assumption will lead to the optimum design because if the dipole pulls apart before the maximum field is exceeded or if the maximum field is exceeded before the tensile strength is exceeded, the result will be the same - namely the complete destruction of the dipole. It should also be pointed out that equation (10) is independent of the current density $J_o$ in the superconducting filaments. Consequently, by specifying the maximum magnetic field $B_m$ (in teslas) and the dipole's aspect ratio $\delta$, it will be possible to determine the optimum proportion of fused silica filaments in the design of the reinforced superconducting cable. Also, in view of equations (6) and (9) it follows that the storage system will approach an optimum over-all design when $\eta \to 0$ because this will result in a maximum value of the ratio $\sigma/\rho$, which in turn will result in a maximum value for the dipole's energy density E/M. From equation (10) we see that for any fixed value of $\delta$, $\eta$ will decrease when $B_m$ is increased. The value of $B_m$ that gives $\eta = 0$, which will be denoted by $B_{m0}(\delta)$ (to show its dependence on δ) will therefore represent the maximum possible field that the dipole could theoretically support without breaking apart. But $\eta = 0$ also means that the cables contain 100% fused silica fibers, which would be impossible because they do not contain any superconducting material. Similarly, when $B_m$ is decreased from its maximum value $B_{m0}(\delta)$, $\eta$ begins to increase from the minimum of $\eta = 0$. Physically, this means that the proportion of reinforcing fused silica fibers in the cable will decrease (from a maximum of 100% when $\eta = 0$) to zero when $\eta = 1$. Let $B_{m1}(\delta)$ denote that value of $B_m$ which gives $\eta = 1$ for a fixed value of δ. Then, for any maximum magnetic field $B_m$ less than $B_{m1}(\delta)$, a cable composed of 100% coated carbon fibers will be sufficiently strong to withstand the maximum possible tension. But this would give $E/M < 1.84 \times 10^6$ Joules/Kg. Consequently, in order to obtain an energy density greater than this value, it will be absolutely essential to have $B_m$ in the interval $B_{m1}(\delta) < B_m < B_{m0}(\delta)$. Tables 2, 3 and 4 are a tabular listing of $\eta$ versus $B_m$ for aspect ratios $\delta = 100$, 500 and 1,000. The corresponding values of σ, ρ, σ/ρ and E/M are also given.

TABLE 2

(γ = 100)

| $B_m$ | $\eta$ | $\sigma \times 10^{-10}$ | ρ | $(\sigma/\rho) \times 10^{-10}$ | $(E/M)(10^{-6})$ |
|---|---|---|---|---|---|
| 24.35 | 1.00 | 0.280 | 1520 | 1.842 | 1.532 |
| 30.00 | 0.87 | 0.426 | 1603 | 2.657 | 2.209 |
| 35.00 | 0.733 | 0.579 | 1690 | 3.426 | 2.849 |
| 40.00 | 0.575 | 0.756 | 1792 | 4.219 | 3.508 |
| 45.00 | 0.396 | 0.956 | 1907 | 5.013 | 4.168 |
| 50.00 | 0.196 | 1.180 | 2034 | 5.801 | 4.824 |
| 54.45 | 0.000 | 1.400 | 2160 | 6.481 | 5.389 |

TABLE 3

(γ = 500)

| $B_m$ | $\eta$ | $\sigma \times 10^{-10}$ | ρ | $(\sigma/\rho) \times 10^{-10}$ | $(E/M)(10^{-6})$ |
|---|---|---|---|---|---|
| 21.50 | 1.000 | .280 | 1520 | 1.842 | 1.598 |
| 25.00 | .915 | .375 | 1574 | 2.382 | 2.066 |
| 30.00 | .768 | .540 | 1668 | 3.237 | 2.808 |
| 35.00 | .593 | .736 | 1780 | 4.135 | 3.587 |
| 40.00 | .392 | .961 | 1909 | 5.034 | 4.367 |
| 45.00 | .165 | 1.215 | 2054 | 5.915 | 5.131 |
| 48.29 | .000 | 1.400 | 2160 | 6.481 | 5.622 |

TABLE 4

(η' 1000)

| $B_m$ | $\eta$ | $\sigma \times 10^{-10}$ | ρ | $(\sigma/\rho) \times 10^{-10}$ | $(E/M)(10^{-6})$ |
|---|---|---|---|---|---|
| 20.67 | 1.000 | .280 | 1520 | 1.842 | 1.618 |
| 25.00 | .884 | .409 | 1594 | 2.566 | 2.254 |
| 30.00 | .723 | .590 | 1697 | 3.477 | 3.055 |
| 35.00 | .533 | .803 | 1819 | 4.415 | 3.879 |
| 40.00 | .314 | 1.048 | 1959 | 5.350 | 4.701 |
| 45.00 | .065 | 1.327 | 2118 | 6.264 | 5.504 |
| 46.21 | .000 | 1.400 | 2160 | 6.481 | 5.694 |

These tables show that a dipole coil configuration will not be able to support magnetic fields in excess of about 55T for aspect ratios greater than 100. This level can therefore be taken as an upper limit for thin ring dipole self-supporting energy storage systems. For fields below about 20T, the carbon fiber substrate material is sufficiently strong to prevent the dipole from bursting so that reinforcing fused silica fibers will be unnecessary. In this case, however, the energy density will be bounded above by $E/M < \sigma_1/\rho_1 = 1.842 \times 10^6$ Joules/kg. The reinforced cable will, however, be required for fields between 20T and 50T which will allow the upper bound on E/M to be raised to about $5.7 \times 10^6$ (which is a factor of 3 greater).

It follows directly from the definition of $\eta$ and equation (7) that the current density $J_o$ of the superconductor coated carbon fibers is related to the dipole radius r by the equation $$J_o = 2B_m/\eta\mu_o \qquad (11)$$

In view of Tables 2, 3, and 4, it is clear that the energy density of the dipole E/M (efficiency) will be increased when the maximum magnetic field $B_m$ is increased. Hence, the first step in designing an efficient dipole magnetic energy storage system is to find a superconductor that will operate in high magnetic fields. It should be noted that at this point in the design, current densities will be of secondary importance compared to $B_m$. Once the maximum operating magnetic field $B_m$ is selected, the maximum current density $J_o$ in the carbon fibers can be made compatible with it by varying r as indicated by equation (11). Table 5 summarizes the useful magnetic field range and the corresponding critical temperature for a few high field superconducting materials. (See "State of the Art of Superconducting Magnets", *Journal of Applied Physics*, Vol. 42, No. 1, January 1971, by Z. Stekly.)

TABLE 5

| Material | Critical Temp. (K°) | Critical Field at 4.2° K (T) |
|---|---|---|
| $Nb_3Sn$ | 18.2 | 24.5 |
| $V_3Ga$ | 16.8 | 21.0 |
| $Nb_3(Al_{0.8}Ge_{0.2})$ | 20.7 | 41.0 |
| $Nb_3Al$ | 17.5 | 30.0 |
| Nb-48%Ti (alloys) | 9.5 | 12.2 |

Thus, on the basis of this data, together with the fact that the coil presented in this patent will operate at superfluid helium temperatures 1° K to 1.6° K, we shall take $B_m = 40T$ and assume that the superconductor is $Nb_3(Al_{0.8}Ge_{0.2})$. We shall also take δ = 1000. Consequently in view of Table 4, the required composite superconducting cable can now be fabricated according to the principles of this invention with $\eta = 0.314$ giving $\rho = 1959$ Kg/m³.

Suppose that the critical current density $J_0$ of the coated carbon fibers, at the superfluid helium operating temperatures and in a field of 40 T, is $7.5 \times 10^8$ amp/m² (75,000 amp/cm²). Consequently in view of equation (11) it follows that $r = 0.270$ m. Therefore, $R = \delta r = 270$m and the total mass M of the dipole will be $M = 2\pi^2 Rr\rho = 763{,}000$ Kg. According to Table 4 the energy density $E/M = 4.701 \times 10^6$ Joules/Kg. Hence, the dipole will have a storage capacity of $3.6 \times 10^{12}$ Joules or 1.0 GW-hour (1,000,000,000 watt-hour). This will be the dipole adopted for the solar power station. Its energy storage capacity E is about equal to the total energy output of Boulder Dam running for one hour.

Referring to FIG. 5, the cross section of the dipole is hexagonal. If its side has length s it follows that its area $A = 3^{3/2}(s^2/2) = \pi r^2$. Consequently, $s = 0.296$ m (11.65 inches). The radius of the cryostat 72 is taken to be 0.32 m (12.6 inches). Therefore, the total volume of superfluid helium coolant will be $157.2 m^3$ which corresponds to a mass of 19,200 kg.

Since the energy of the dipole comes from the solar array 50, the orbit of the solar power station is selected so that its solar array is exposed to a maximum amount of sunlight. If the orbit is low (for example a circular orbit 400 Km above the earth's surface) it will have to be a nearly polar orbit. In this case the orbital plane will have a slow rotation rate of 360° per year to prevent falling into the earth's shadow. If the station is at geosynchronous orbital altitude (35,767 Km) with inclination zero it would appear stationary to points on the earth's surface. Moreover, it would be in constant sunlight except for relatively brief periods (of about one hour each day) during the spring and fall.

Since the dimensions of the dipole have now been determined, the preferred design dimensions of the entire solar power station can now be given. Referring to FIG. 1, the solar cell array 50 is square and 500 m on end. It will be maintained in an attitude perpendicular to the sun's rays 78. The solar radiation falling on the array 50 will be increased with little additional cost by utilizing large, light weight reflectors of highly reflective, aluminized Mylar 80. In particular, four such reflectors, 500 m square are attached to each of the four edges of the solar array 50 (FIG. 1). The planes of these reflectors 80 form obtuse dihedral angles of 120° with the plane of the array 50. Therefore all of the solar radiation 78 falling on these four reflectors 80 is reflected onto the array of solar cells 50 to boost its output. The edges of the reflectors 80 perpendicular to the edge connected to the array 50 form four triangles. These triangular spaces are filled by additional triangular aluminized Mylar reflectors 82. Each of these triangular reflectors has an area of $(500)^2(\sqrt{28}/16)m^2$. Since the dihedral angle of these triangular reflectors 82 with the plane of the array 80 (which is perpendicular to the solar radiation 78) is 112.2°, each intercepts $500^2(\sqrt{28}/16) \times \cos 67.8$ square meters of solar radiation which is also reflected onto the solar array 50. Each of the rectangular reflectors 80 intercepts $500^2 \cos 60°$ square meters of solar radiation which is converted by the solar cells into electricity. The total effective area of solar radiation intercepted by the array is, thus, $500^2[1 + 4 \cos 60° + 4 (\sqrt{28}/16) \cos 67.8°]m^2 = 875,000m^2$. If we assume that the efficiency of the solar cells is 12% (which is about standard) then, since the solar constant is 1.34KW/M$^2$, the array 50 generates a continuous electric power of 140.7MW. This power is fed continuously into the dipole's flux pumps that charge the system until it is charged to its full capacity. At this rate, a completely discharged dipole is fully recharged to its maximum 1.0 GW-hours of energy in 7.11 hours. Flux pumps, recently described by T. Droege et al (See "A Slow Cycling Flux Pump Using Digital Control", *IEEE Transactions on Magnetics,* Vol. MAG-11, No. 2, March 1975, p. 580) may be ideal for charging the dipole as efficiencies exceeding 99% appear possible. As an alternative the flux pump described by Laquer et al in U.S. Pat. No. 3,414,777 entitled "Automatic Superconducting Pump" can be used. Energy is taken out of the dipole (that is, it is discharged) by methods well known in the art of superconducting magnets. For example, the discharge system described by Prost, et al in U.S. Pat. No. 3,479,569 entitled "Method and Apparatus for Releasing Electrical Energy" can be used for discharging the dipole. As described in the patent, this system can also be used as a flux pump to initially charge the dipole.

Assuming that the solar array and structure has an area density of 0.5 Kg/m$^2$, the array 50 has a total mass of 125,000 Kg. The aluminized Mylar has an area density of 0.06565 Kg/m$^2$. The reflectors have a total mass of 87,400 Kg. The structure is a light weight structural frame of non-conductive fiber reinforced composites for minimum weight. Tension and bending loads are resisted by light weight framing trusses and cables most of which are omitted from the drawings for clarity. The entire array, reflectors and supporting structure (of the array and reflectors) has a total mass of about 220,000 Kg.

The superconducting dipole magnet 56 is structurally attached to the array 50 by two beams 84 extending in a perpendicular direction behind the plane of the array 50. Since the dipole is 540m in diameter it always remains in the shadow of the array 50 and reflectors 80, 82. This greatly assists in maintaining the required superfluid helium temperatures inside the dipole. However, even though the over-all in-out efficiency of the dipole may be very high, perhaps exceeding 99%, some heat is generated. Ideally, this heat would be picked up by the superfluid helium (which has an exceedingly high heat capacity and thermal conductivity) and transferred to the outer toroidal wall of the cryostat 72 where it is given off as radiation due to the spacial absorption and emissivity properties of the "Z-93" white paint that is painted on its exterior surface. But since lowest possible temperatures will be required in order to maintain the exceedingly high magnetic fields, a special refrigerating system 86 is provided. This housing 86 also contains all of the flux pumps, superconducting switches, power conditioners, helium dewars, helium circulating pumps and other related equipment.

If the axis of the dipole magnet were kept fixed along one direction while orbiting the earth, very large torques would be generated due to interaction with the earth's magnetic field. Therefore, to eliminate these unwanted torques the dipole 56 is mounted inside a large square frame 88 and co-centric with it so that it can pivot freely about any axis. In particular, the dipole 56 is mounted inside the square frame 88 by two trunnions 90 on each end of the dipole's vertical diameter as shown in FIG. 1. These trunnions 90 serve as a pivot axis that allows the dipole to pivot about an axis perpendicular to the array 50. The square frame 88 is itself mounted between the two beams 84 by similar hollow trunnions 92 on each side of it and along a line perpendicular to the beams 84. These trunnions 92 serve as a second pivot axis that allows the square frame 88 to pivot about an axis perpendicular to the beams 84. Hence, the axis of the dipole can freely point to any direction without generating any unwanted torque.

The trunnions 92 are mounted 1,000 m from the plane of the array 50. Hence, the center of the dipole 56 (which is fixed) is 1,000m from the array 50. The maximum magnetic field that can fall on the array (when the dipole's axis is directed at it) is $2.223 \times 10^{-3}$T (22.23 Gauss). This field is about 40 times as large as the earth's natural magnetic field at Cambridge, Mass. To minimize structural torque on the station no ferromagnetic materials are used in its structural frame.

The beams 84 extend for another 1000 meters past the trunnions 92 to a structure 94 which supports eight large solar radiation pressure vanes 96. These vanes 96 are mounted in pairs hinged together along one edge in each of the four quadrants. The amount of solar pressure acting on each pair is controlled by controlling the dihedral angle $\theta$ between each member of the pair. This is accomplished by servo controlled electric motors receiving commands from an attitude sensing system. This passive attitude control system keeps the array perpendicular to the incident solar radiation 78. The vanes 96 are also constructed of highly reflective aluminized Mylar and are 500m square. For a detailed description concerning attitude control by pressure vanes see "Attitude Control of Satellites Using the Solar Radiation Pressure", Journal of Spacecraft and Rockets, September 1972, p. 711 by V. Modi and K. Kumar, and also U.S. Patent No. 3,304,028 entitled "Attitude Control for Spacecraft". Since the vehicle may enter the earth's shadow, a secondary active attitude control system 97 is provided that uses ordinary vernier jets.

Unlike the solar array, the electromagnetic radiation transmitter 54 requires an extremely accurate attitude control system. Hence, it is located at a position far from the dipole's magnetic field. Since it is a relatively small system compared to the solar array, it can be positioned in front of it. Thus, the solar array 50 will almost always be between the dipole 56 and transmitter 54. Power is fed to the transmitter 54 by a superconducting power line 98. (See, "Investigations on Potential Conductors For a D.C. Superconducting Power Transmission Line In a 20 Meter Test Bed", IEEE Transactions on Magnetics, Vol. MAG-11, No. 2, March, 1975, by J. Hoffer.) The line 98 passes from the transmitter 54 and into a hollow mast 100 that extends from the front center of the array 50 in a perpendicular direction. The mast 100 is 3,000 meters long. The power line 98 continues all the way through the mast 100, into the hollow beams 84, through the hollow pivot trunnions 92 through the frame of the square 88, into the hollow rods 90 and to the power conditioning units of the dipole. There is about 1,000 meters of slack power line between the transmitter 54 and mast 100. The maximum magnetic intensity 4,000 meters from the dipole is about 0.4 Gauss. Actually the field at the transmitter would be much lower because the solar array 50 is between it and the dipole.

The transmitter 54 transmits either laser or microwave radiation depending on usage. The radiator has a phased array design 102 (microwave or optical) so that the beam steering is accomplished electrically and not mechanically. A detailed exposition on phased array transmitting antennas with electronic beam steering is provided in *Microwave Scanning Antennas* edited by R. C. Hansen in three volumes entitled *Apertures* (1964), *Array Theory* (1966), and *Array Systems* (1966) Optical phased arrays with electronic beam steering are explained in detail in "Electronically Scanned Wave Guide Laser Arrays", Applied Optics, Vol. 13, No. 8, August 1974, by V. Corcoran and I. Crabbe.

Recent developments in attitude control systems for orbiting satellites show that an attitude can be held and maintained to an accuracy of at least $\pm 0.005$ arc-seconds ($\pm 2.4 \times 10^{-8}$ radians). See "Fine Pointing System for Large Orbiting Telescopes", *Journal of Spacecraft and Rockets*, Vol. 11, No. 5, May 1974, pp. 273-274, by W. Schiehlen. The attitude control system described in the Schiehlen paper is a preferred system adopted for the transmitter's attitude control system 104. Also see U.S. Pat. No. 3,781,647 for a discussion of attitude control systems used in transmitter systems. For example, a laser beam pointing to a specific spot on the earth's surface from a synchronous orbit, that is held to an accuracy of $\pm 0.005$ arc-seconds will move a maximum of only 86.7 cm. Hence, if the beam width at the earth's surface is greater than 1.73 meters, the point would be under constant illumination. The electronic beam steering receives steering commands from an extremely accurate laser ranging and tracking system 106. See "Automatic Laser Tracking and Ranging Systems", *Applied Optics*, Vol. 11, No. 2, February 1972, by C. Calce and "Control Optimization of a Laser Automatic Tracking System: Influence of the Space-Time Return of the Echoes", *Applied Optics*, Vol. 11, No. 2, February 1972, by M. Staron.

In order to obtain efficient long range wireless power transmission, the transmitter uses a large diameter focused aperture. If $d$ denotes the diameter of this aperture, it is possible to focus the beam so that the diameter $b$ of its 3 db main lobe at a distance D from the aperture is less than the diameter of the aperture itself. This will be possible if the distance D is less than the aperture's near-field distance defined by $d^2/\lambda$, where $\lambda$ denotes the beam's wave length. In particular, the beam can be focused so that the focused diameter $b$ is approximately equal to $\lambda D/d$. (See "Minimum Spot Size of Focused Apertures", *Electromagnetic Wave Theory, Part 2*, Pergamon Press, (1965) pp. 661–667). For example, the 3 db beam diameter $b$ of a focused Neon gas laser, 20 meter diameter optical phased array, at a range of 35,793 km (synchronous orbit altitude) is equal to $\lambda D/d = (0.632817 \times 10^{-6}\text{meters})(35,793,000 \text{ meters})/20 \text{ meters} = 1.13$ meters. Essentially all of the propagated power will pass through this spot size (assuming that the aperture's fill-ratio is near unity). The aperture's near-field range $d^2/\lambda = 6.32 \times 10^8$ meters = 392,000 miles.

Although the over-all dimensions of this orbiting solar power station are large, its structure, aside from the dipole magnet, is very light weight. The structures 84, 86, 94 and 100 are made rigid by a network of very thin nylon or glass fiber guide lines 108 (most of which are not shown). The entire station, including the transmitter 54 and power line 98 has a total mass of about 1,100,000 Kg (1,200 tons).

The entire power station is transported to orbit in sections and assembled there by astronaut construction workers. The assembly orbit can be low to take advantage of the maximum ground to orbit payload capabilities of NASA's reusable space shuttle. This maximum payload will be about 30,000 Kg and each flight will cost about 10 million dollars (See "Single-Stage Shuttle for Ground Launch and Air Launch", *Astronautics & Aeronautics*, Vol. 12, No. 3, March 1974, by R. Salkeld, p. 52). Hence, it will require about 40 flights to deliver the entire structure at a cost of about $400 million.

Since the dipole mass is 763,000 Kg, it will require about 25 shuttle flights to deliver it. Hence, the dipole coil is wound from 25 individual cables that are wound in parallel at the same time. Each cable has its own flux pumps and associated electronics. The coil is wound so that it is relatively easy to add additional cables later after it goes into operation. This modular coil design makes it possible to increase the dipole's energy storage capacity from time to time without having to construct a new dipole. Dipole coils are easily adaptable to this modular design feature. The station preferably operates from geosychronous orbit. Hence, after it is assembled and tested in its initial orbit, it is transported to its final orbit. This journey to its geosychronous orbit can be achieved by high efficiency, electric propulsion engines, temporarily attached to the station and drawing power from the solar array.

It should be emphasized that the power which the dipole 56 can deliver to the transmitter 54 is limited, essentially, only by the capacity of the power conditioning units and transmission line 98. The power conditioning system is fored as a collection of many individual units operating in parallel. This greatly increases its capacity and provides redundancy. It is well known that a relatively small diameter superconducting power line is able to transmit many GWs of power. Hence, the station can be designed to handle power levels in the 10 GW to 20 GW range without serious difficulty. A continuous power surge of 10 GW can last 6.1 minutes before the dipole magnet is completely discharged.

It has been estimated that the transportation cost to deliver a Glaser type 10 GW solar power station to a low orbit will be about 13.8 billion dollars. (See "Solar Power Via Satellite", *Astronautics & Aeronautics,* Vol. 11, No. 8 August 1973, by P. Glaser.) This compares with only $400 million for the design presented here - a reduction of 13.4 billion dollars. The only constraint on the orbiting solar power station described in this patent is its inability to deliver long, uninterrupted surges of high power over indefinitely long time periods. But, for the applications envisioned in this patent, continuous power transmission, over indefinitely long time periods, is not needed.

Although limited embodiments of a high power orbiting solar power station have been described and illustrated herein, many modifications and variations will be apparent to one skilled in the art. It is therefore to be understood that, within the scope of the appended claims, the invention may be practiced otherwise than as specifically described. For example, instead of using a magnetic energy storage system a flywheel inertial energy storage system could be used for accumulating and storing the solar energy. A suitable flywheel inertial energy storage system 112 is described by Post in U.S. Pat. No. 3,683,216 entitled "Inertial Energy Storage Apparatus and System for Utilizing the Same." This system is equipped with a motor/alternator attachment which is used to inject or extract energy from the flywheel. The electrical current generated by the solar array 50 is fed into the motor which speeds up the flywheel, thus storing solar energy in the form of inertail energy in the flywheel. Energy is extracted from the flywheel by operating the motor as an alternator thereby converting the stored inertial energy of the flywheel into high power electrical current which is used to energize the transmitter 54. The structure 112 of each individual flywheel unit is shown schematically in FIG. 6. The entire system 110 (which is mounted where the magnetic energy storage system was mounted in the embodiment of FIG. 1) comprises many individual flywheel units 112 each having a total mass of 30,000 Kg so that they can be transported as completely assembled units by the shuttle vehicle. Although the energy density is not as great in a flywheel storage system as the magnetic system, fabrication or other operational features may make it advantageous. Additional details of such a system are set forth in the aforementioned parent application.

Alternatively instead of using solar cells for collecting solar radiation and converting it to electrical energy, one can use a Brayton cycle thermal power generator for more efficient power conversion at the cost of greater weight. A suitable system is described in "Feasibility of Large-Scale Orbital/Solar Thermal Power Generation" by J. T. Patha and G. R. Woodcock, *Journal of Spacecraft & Rockets,* Vol. 11, No. 6, June 1974. Thermoelectric conversion devices may also be suitable. Other energy storage systems could also be used for accumulating energy accumulated gradually from solar radiation for discharge rapidly as the energy is beamed by wireless electromagnetic radiation.

As various changes can be made in the above solar power station without departing from the scope of the invention, it is intended that all matter contained in the above description or shown in the accompanying drawings should be interpreted as illustrative and not in a limiting sense.

What is claimed is:

1. An orbiting solar powered space station comprising:
    a structural frame;
    energy gathering assembly means mounted on the frame for continuously collecting and converting incident solar radiation into electrical power;
    a superconducting magnet for inductive energy storage mounted on the frame;
    means for charging said superconducting magnet by current generated by said energy gathering assembly means;
    means for discharging said superconducting magnet;
    transmitter means for intermittently coverting electrical power generated by dishcarging said superconducting magnet into unmodulated coherent electromagnetic radiation for beamed wireless power transmission.

2. An orbiting solar power space station as set forth in claim 1 wherein said means for discharging said superconducting magnet discharges the magnet at a rate that is larger than the rate of generation from said energy gathering assembly means.

3. A station as defined in claim 1 wherein the transmitter means for converting power into radiation comprises means for transmitting power to a receiver in the near field of an antenna of the transmitter means 4. A station as set forth in claim 1 wherein the superconducting energy storage magnet is a self-supporting dipole.

5. A station as set forth in claim 4 wherein the supeconducting energy storage dipole comprises a plurality of high strength superconducting cables fabricated from a multi-filament collection of thin fibers having high tensile strength to density ratio and coated with a thin layer of superconducting material;
    said cables being reinforced by additional fibers having a higher tensile strength to density ratio than said coated fibers;
    said cables each having an equilteral triangular transverse cross-section; and
    said dipole having a solid hexagonal cross section with no empty spaces between adjacent cables.

6. A superconducting dipole as set forth in claim 5 wherein the surface of said dipole is surrounded by superfuid helium bounded between the dipole's external surface and the internal side of a larger, co-centric torus; the external surface of said torus being coated with a material having a low coefficient of absorption for solar radiation and a high coefficient of emissivity.

7. An orbiting solar power space station as set forth in claim 1 wherein said superconducting magnet is mounted on said frame by two mutually perpendicular pivot trunnions, said trunnions comprising two perpendicular rotation axes which allows said magnet to assume any attitude relative to said frame thereby obviating any torque that would be generated by interacting with the earth's natural magnetic field.

8. An orbiting solar power station as set forth in claim 1 further comprising a plurality of solar radiation pressure vanes for maintaining the energy gathering assembly means in an attitude perpendicular to incident solar radiation.

9. An orbiting solar power station as set forth in claim 1 wherein said transmitter means is maintained in a remote, spaced apart attitude from the structural frame supporting the energy gathering assembly means and superconducting magnet; and further comprising a flexible superconducting power transmission cable for conveying power from said superconducting magnetic energy storage system to said transmitter; and an attitude control system for said transmitter for maintaining attitude of the transmitter independent from the attitude of said energy gathering assembly means;

said beam of radiation being propagated by a phased array transmitting antenna with electronic beam steering.

10. A method of operating an orbiting solar power station comprising the steps of:

continuously collecting solar radiation and transforming it into electric power;

charging an energy storage system with said electric power at a relatively low rate over extended time periods and thereby accumulating large amounts of energy;

intermittently discharging the energy storage system at a rate higher than the charging rate for generating a power greater than that generated by said energy gathering assembly means and converting the resulting electric power into unmodulated electromagnetic radiation for beamed wireless power transmission to a receiver in the near field of a transmitter antenna.

11. A method as defined in claim 10 wherein the step of charging comprises generating a magnetic field in a superconducting magnetic dipole.

12. A method as defined in claim 10 wherein the step of charging comprises spinning flywheel inertial energy storage units.

13. A superconducting energy storage dipole comprising:

a plurality of high strength superconducting cables fabricated from a multi-filament collection of thin fibers having high tensile strength to density ratio and coated with a thin layer of superconducting material;

said cables being reinforced by additional fibers having a higher tensile strength to density ratio than said coated fibers;

said cables each having an equilateral triangular transverse cross-section; and said dipole having a solid hexagonal cross section with no empty spaces between adjacent cables.

14. A superconducting dipole as set forth in claim 13 wherein the surface of said dipole is surrounded by superfluid helium bounded between the dipole's external surface and the internal side of a larger, co-centric torus; the external surface of said torus being coated with a material having a low coefficient of absorption for solar radiation and a high coefficient of emissivity.

* * * * *

UNITED STATES PATENT AND TRADEMARK OFFICE
CERTIFICATE OF CORRECTION

PATENT NO. : 4,078,747
DATED : March 14, 1978
INVENTOR(S) : Michael A. Minovitch It is certified that error appears in the above-identified patent and that said Letters Patent are hereby corrected as shown below:

```
Column 2, line 12,  "π" should be -- ρ --;
          line 31,  "π" should be -- ρ --.
Column 3, equation (3) should be -- E/M = σ/ρ --.
Column 6, line 6,   "π" should be -- ρ --;
          lines 27 and 28, "δ" should be -- ∂ --.
Column 8, line 12,  "δ" should be -- γ --;
          line 21,  "δ" should be -- γ --.
Column 9, line 18,  "would" should be -- wound --;
          line 29,  "δ" should be -- γ --;
          line 59,  "δ>>i" should be -- γ>>1 --.
Column 10, line 58, "δ" should be -- γ --;
           line 66, "δ" should be -- γ --;
           line 68, "δ" should be -- γ --.
Column 11, line 1,  "δ" should be -- γ --;
           line 7,  "δ" should be -- γ --;
           line 11, "δ" should be -- γ --;
           line 12, "δ" should be -- γ --;
           line 13, "δ" should be -- γ --;
           line 19, "δ" should be -- γ --;
           line 21, "δ" should be -- γ --;
```

UNITED STATES PATENT AND TRADEMARK OFFICE
CERTIFICATE OF CORRECTION

Page 2 of 2

PATENT NO. : 4,078,747
DATED : March 14, 1978
INVENTOR(S) : Michael A. Minovitch It is certified that error appears in the above-identified patent and that said Letters Patent are hereby corrected as shown below:

line 44, "$\eta^1$ 1000" should be -- $\gamma = 1000$ --.
Column 12, line 36, "$\delta$" should be -- $\gamma$ --;
              line 44, "$\delta$" should be -- $\gamma$ --.
Column 15, line 41, after "(1966)" insert a period.
Column 16, line 64, "fored" should be -- formed --.

Signed and Sealed this

Twenty-second Day of August 1978

[SEAL]

Attest:

RUTH C. MASON
Attesting Officer

DONALD W. BANNER
Commissioner of Patents and Trademarks